US012780135B2

(12) United States Patent
Morris et al.

(10) Patent No.: US 12,780,135 B2
(45) Date of Patent: Nov. 3, 2026

(54) DYNAMIC ADJUSTMENT OF A VEHICLE CONTACT SENSOR SENSING THRESHOLD

(71) Applicant: GM GLOBAL TECHNOLOGY OPERATIONS LLC, Detroit, MI (US)

(72) Inventors: Tyler P. Morris, Madison Heights, MI (US); Emily F. Wolfangel, West Bloomfield, MI (US); Ashraf Abualfellat, Grand Blanc, MI (US); Ryan A. Gellner, Livonia, MI (US); Mohammadali Shahriari, Markham (CA); Ke Dong, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 18/958,127

(22) Filed: Nov. 25, 2024

(65) Prior Publication Data

US 2026/0145631 A1 May 28, 2026

(51) Int. Cl.

*B60R 21/0132* (2006.01)
*B60R 21/0134* (2006.01)
*B60R 21/01* (2006.01)

(52) U.S. Cl.

CPC ...... *B60R 21/0132* (2013.01); *B60R 21/0134* (2013.01); *B60R 2021/01231* (2013.01); *B60R 2021/01322* (2013.01)

(58) Field of Classification Search

CPC ........................ B60R 21/0132; B60R 21/0134
See application file for complete search history.

(56) References Cited

U.S. PATENT DOCUMENTS

| | | | | |
|---|---|---|---|---|
| 12,198,546 | B1 * | 1/2025 | Cheng | G08G 1/096716 |
| 2005/0033516 | A1 * | 2/2005 | Kawasaki | G01C 21/26 340/436 |
| 2015/0166059 | A1 * | 6/2015 | Ko | B60W 30/09 701/28 |
| 2016/0318523 | A1 * | 11/2016 | Kim | B60K 35/10 |
| 2020/0180553 | A1 * | 6/2020 | Kim | B60R 22/48 |
| 2024/0101128 | A1 * | 3/2024 | Bradley | G06N 20/00 |
| 2024/0416899 | A1 * | 12/2024 | Barrera | G06V 10/82 |
| 2025/0087091 | A1 * | 3/2025 | Hucek | B60W 30/09 |

(Continued)

FOREIGN PATENT DOCUMENTS

| | | |
|---|---|---|
| DE | 102007039038 A1 | 1/2009 |
| DE | 102013200453 A1 | 7/2013 |

(Continued)

*Primary Examiner* — Long T Tran
(74) *Attorney, Agent, or Firm* — Quinn IP Law

(57) ABSTRACT

A method for dynamically adjusting a sensing threshold of a vehicle contact sensor of a force management system of a vehicle includes detecting an object external to the vehicle via one or more vehicle environment sensors and then determining, based at least partially on data from the one or more vehicle environment sensors, a current path of the vehicle, a current trajectory of the object, and whether the current path of the vehicle and the current trajectory of the object intersect. The method assigns a categorization of predicted contact of the vehicle with the external object based at least partially on the data from the one or more vehicle environment sensors and adjusts, based on the categorization, a trigger threshold of the vehicle contact sensor at which an energy absorbing component is activated.

20 Claims, 4 Drawing Sheets

(56) References Cited

U.S. PATENT DOCUMENTS

| | | | | |
|---|---|---|---|---|
| 2025/0196847 | A1* | 6/2025 | Shin | B60W 30/0956 |
| 2025/0326390 | A1* | 10/2025 | Wi | B60W 30/09 |
| 2025/0360775 | A1* | 11/2025 | Kim | B60H 1/00742 |

FOREIGN PATENT DOCUMENTS

| | | | |
|---|---|---|---|
| DE | 102014200813 | A1 | 7/2015 |
| DE | 102018105014 | A1 | 9/2018 |
| WO | 2005082681 | A1 | 9/2005 |

* cited by examiner

DYNAMIC ADJUSTMENT OF A VEHICLE CONTACT SENSOR SENSING THRESHOLD

INTRODUCTION

Some vehicle force management systems rely on a signal from a vehicle contact sensor, such as a pressure sensor or an accelerometer, to determine when to activate an energy absorbing component such as a restraint system, including an airbag, a seatbelt, or another restraint system, including a multi-stage restraint system. An electronic controller of the force management system may activate the energy absorbing component when the signal exceeds a predetermined trigger threshold. The vehicle may also include a disconnect device that effectively cuts electric power to and from an electrical system under certain predetermined conditions considered indicative of imminent or present contact of the vehicle with an external object.

SUMMARY

Disclosed herein is a method of dynamically adjusting a sensing threshold of a vehicle contact sensor of a force management system of a vehicle, a predictive control system for force management response of a vehicle, and a vehicle that includes the force management system and has one or more electronic control modules configured to implement the method. “Dynamically adjusting” or a “dynamic adjustment” refers to an adjustment executed in real time, during operation of the vehicle. Data from one or more vehicle environment sensors, such as may be included in an automated driver assistance system of the vehicle, is utilized in real time during vehicle use to inform and in some cases adjust a trigger threshold of the vehicle contact sensor of the force management system.

The method includes detecting an object external to the vehicle via one or more vehicle environment sensors and then determining, based at least partially on data from the vehicle environment sensors, a current path of the vehicle, a current trajectory of the object, and whether the current path of the vehicle and the current trajectory of the object intersect. If it is determined that the current path of the vehicle and the current trajectory of the external object intersect, the method includes assigning a categorization of predicted contact of the vehicle with the external object based at least partially on the data from the vehicle environment sensors and, based on the categorization, adjusting, a trigger threshold of a vehicle contact sensor at which an energy absorbing component is activated.

In some implementations, aspects of the method may be carried out by different electronic control modules included in different vehicle systems that are configured to communicate with one another according to the method. For example, the one or more environment sensors may be included in an automated driver assistance system (ADAS) of the vehicle, and the energy absorbing component and the vehicle contact sensor may be included in a force management system (FMS) of the vehicle. As such, the steps of determining the current path of the vehicle, the current trajectory of the object, whether the current path of the vehicle and the current trajectory of the object intersect, and assigning the categorization may be executed by an electronic control module of the ADAS. The method may include communicating the categorization from the electronic control module of the ADAS to an electronic control module of the FMS, and the step of adjusting the trigger threshold of the vehicle contact sensor may be executed by the electronic control module of the FMS.

In an aspect, the method may include determining one or more of a velocity differential (e.g., a difference in velocity of the external object and the vehicle), vehicle acceleration, a time to predicted contact, a predicted contact angle, and a predicted direction of contact of the external object of the vehicle and the external object based at least partially on the data from the one or more vehicle environment sensors. The categorization may be based at least partially on the velocity differential, the vehicle acceleration, the time to predicted contact, the predicted contact angle, and the predicted direction of contact. It is understood that vehicle acceleration may be positive or negative (e.g., deceleration).

In an example, the categorization may include a first category, a second category, and a third category. The velocity differential and the vehicle acceleration may be lower in the first category than in the second category, and lower in the second category than in the third category. Furthermore, the adjustment of the trigger threshold may be a downward adjustment for the second category and for the third category. In an implementation, the trigger threshold may not be adjusted for the first category. In other words, when the assigned categorization, activation of the energy absorbing component will be triggered according to the existing, pre-programmed trigger threshold (which may be referred to as the default trigger threshold). The downward adjustment of the trigger threshold may be greater for the third category than for the second category. As such, a velocity differential and/or a vehicle acceleration that is relatively high and is thus indicative of a relatively short time to predicted contact may result in the lowest trigger threshold and, potentially, the earliest activation of the energy absorbing component.

In various examples, the energy absorbing component may be a restraint such as an air-bag or a seatbelt, and/or may be a seatbelt tensioner, an active hood or bumper, or another controllable component configured to manage energy due to contact of the vehicle with the external object. In some implementations, the energy absorbing component may be a multi-stage restraint or a reversible restraint. In such implementations, the categorization may be the third category. This may afford an opportunity to activate a second or later stage of the multi-stage restraint or to activate the reversible restraint relatively earlier in time.

In an aspect, the vehicle may include multiple energy absorbing components located in different regions of the vehicle. The predicted contact angle and the predicted direction of contact may indicate that the predicted contact is with a specific one or more of the different regions. The trigger threshold adjusted may be a threshold for activation of one or more of the energy absorbing components in the specific one or more of the different regions. In this manner, the method focuses on the region or regions likely to be affected by the predicted contact.

In some examples, the adjusted trigger threshold may inform activation of components of other vehicle systems in addition to the energy absorbing component of the force management system. In an implementation, the vehicle may include an electric power system having an electric power device, an additional electronic control module operable to control electric power to the electric power device, and a disconnect device operable to terminate electric power flow to and from the additional electronic module. Under the method, the disconnect device may be activated at the trigger threshold of the vehicle contact sensor. For example, the disconnect device may cut electrical power to a relatively high voltage battery system when activated. As described with respect to activation of the energy absorbing components, activation of the disconnect device may be region-specific. For example, the electric power system may be one of multiple electric power systems located in different regions of the vehicle, each including an additional electronic module and a disconnect device. The predicted contact angle and the predicted direction of contact may indicate that the predicted contact is with a specific one or more of the different regions. The disconnect device activated under the method may be for one or more of the additional electronic modules located in the specific one or more of the different regions.

The method may also help to identify a vehicle environment having aspects that might otherwise be unnecessarily (i.e., falsely) grouped with an indication of imminent vehicle contact with an external object. For example, the method may include determining whether the data from the one or more vehicle environment sensors is indicative of a predetermined specific vehicle operating environment. Such an environment may include, for example, an off-road environment, train tracks, or other terrain that may affect the vehicle contact sensor signal, causing it to exceed the default trigger threshold due to movement of the vehicle unrelated to imminent or present contact with an external object, including changes in velocity or acceleration of the vehicle. By utilizing the ADAS, for example, such an environment may be identified using a vehicle environment sensor of a camera system, a radar unit, a lidar unit, and/or a global positioning system (GPS system), included in the ADAS. If it is determined that the current path of the vehicle and the current trajectory of the object do not intersect, the trigger threshold may be adjusted upwards or may be maintained under the method. In other words, the trigger threshold may be set to higher than a default trigger threshold for these operating environments or the default trigger threshold may be maintained. Energy absorbing components and/or disconnect devices are thus not unnecessarily deployed due to the terrain or driving behavior, for example, when imminent contact of the vehicle with an external object (e.g., intersection of the current path of the vehicle with a current trajectory of the external object) is not predicted.

Disclosed herein is a predictive control system for force management response of a vehicle that includes an automated driver assistance system (ADAS). The ADAS has one or more vehicle environment sensors configured to detect an object external to the vehicle and an electronic control module in operative communication with the one or more vehicle environment sensors. The predictive control system further includes a vehicle force management system (FMS) having a vehicle contact sensor, an energy absorbing component, and an electronic control module in operative communication with the vehicle contact sensor and the energy absorbing component. The electronic control module of the ADAS is operable to determine, based at least partially on data from the one or more vehicle environment sensors, a current path of the vehicle, a current trajectory of the object, and whether the current path of the vehicle and the current trajectory of the object intersect. The electronic control module of the ADAS is further operable to assign a categorization of the predicted contact of the vehicle with the external object based at least partially on the data from the one or more vehicle environment sensors if the current path of the vehicle and the current trajectory of the external object are determined to intersect and then communicate the categorization to the electronic control module of the FMS. The electronic control module of the FMS is operable to then adjust, based on the categorization, a trigger threshold of the vehicle contact sensor at which an energy absorbing component is activated. Accordingly, the predictive control system utilizes the data from the one or more vehicle environment sensors of the ADAS to inform the response of the FMS.

A vehicle disclosed herein includes an automated driver assistance system (ADAS) that has an electronic control module and one or more vehicle environment sensors in operable communication with the electronic control module of the ADAS. The one or more vehicle environment sensors are configured to detect an object external to the vehicle. The vehicle further includes a vehicle force management system (FMS) that has a vehicle contact sensor, an energy absorbing component, and an electronic control module in operable communication with the vehicle contact sensor and the energy absorbing component. The electronic control module of the ADAS is operable to determine, based at least partially on data from the one or more vehicle environment sensors, a current path of the vehicle, a current trajectory of the external object, and whether the current path of the vehicle and the current trajectory of the external object intersect. The electronic control module of the ADAS is further operable to assign a categorization of the predicted contact of the vehicle with the external object based at least partially on the data from the one or more vehicle environment sensors if the current path of the vehicle and the current trajectory of the external object are determined to intersect. The electronic control module of the ADAS is further configured to communicate the categorization to the electronic control module of the FMS. The electronic control module of the FMS is operable to adjust, based on the categorization, a trigger threshold of the vehicle contact sensor at which the energy absorbing component is activated.

The above features and advantages and other features and advantages of the present disclosure are readily apparent from the following detailed description of the best modes for carrying out the disclosure when taken in connection with the accompanying drawings.

DETAILED DESCRIPTION

Figure 1:
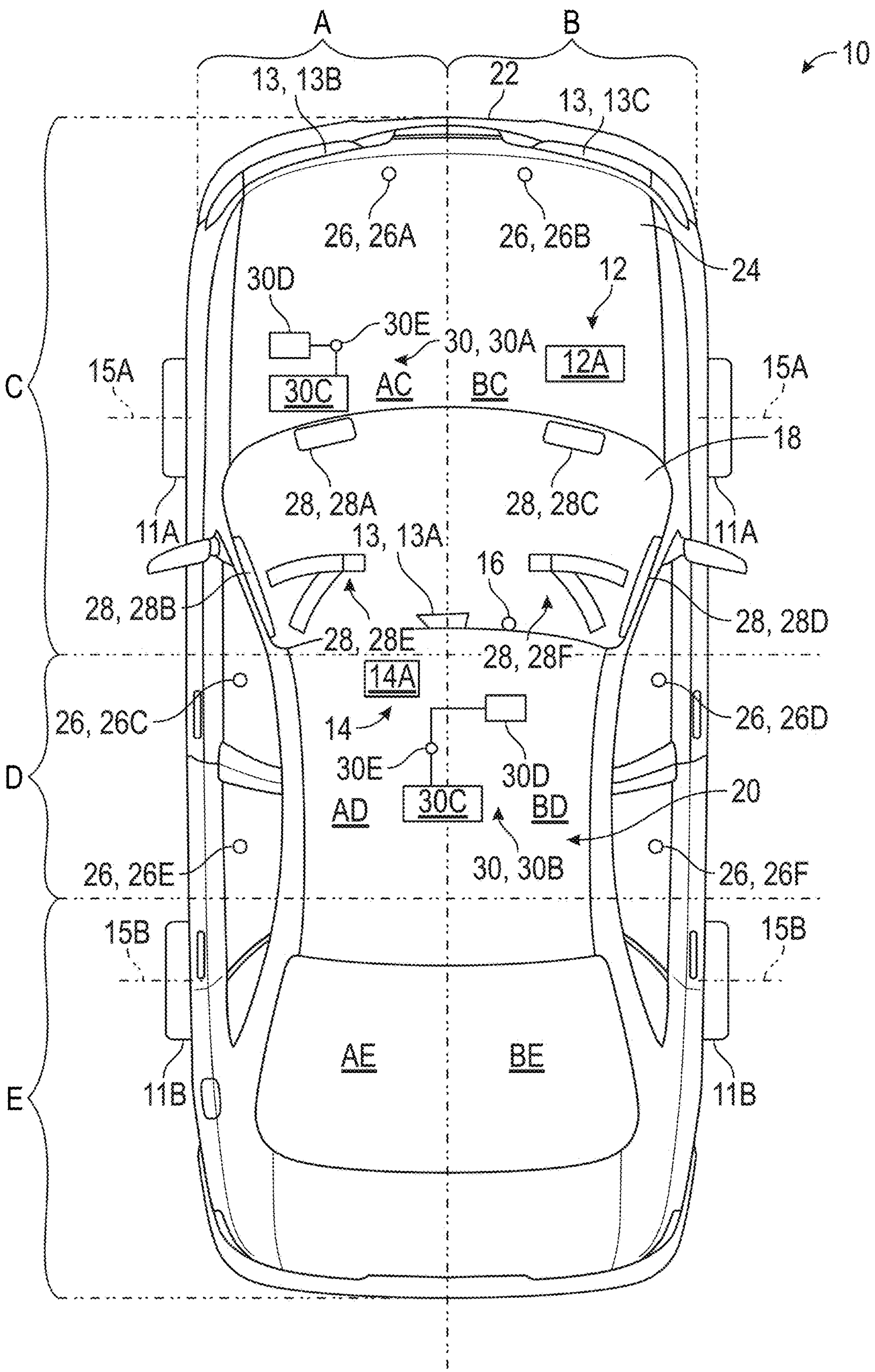
FIG. 1 is schematic plan view of a vehicle including an automatic driver assistance system (ADAS) and a force management system (FMS).

Referring to the drawings, wherein like reference numbers refer to like components throughout the views, FIG. 1 shows a vehicle 10 that includes various vehicle systems controlled by one or more electronic control modules to carry out various different functions. The one or more electronic control modules have a requisite memory and a processor, as well as other associated hardware and software, e.g., a clock or timer, input/output circuitry, etc. The memory may include sufficient amounts of read only memory, for instance magnetic or optical memory. Instructions embodying the method 100 discussed herein may be programmed as computer-readable instructions into the respective memory and executed by the respective processor of the one or more electronic control modules during operation of the vehicle 10. In some examples, there are multiple electronic control modules that each execute different portions of the method 100 as discussed herein.

As used herein, a "vehicle" such as vehicle 10 includes a mobile platform such as, but not limited to, a passenger car, sport utility car, light truck, heavy duty truck, all-terrain vehicle, minivan, bus, transit vehicle, bicycle, robot, farm implement (e.g., tractor), sports-related equipment (e.g., golf cart), boat, airplane and train. The vehicle 10 may take many different forms and may include multiple and/or alternate components than shown, may have various types of propulsion systems including an internal combustion engine, a hybrid or fully electric propulsion system, a fuel cell system, etc., and may be fully or partially autonomous. As shown, the vehicle 10 has four wheels arranged as a front pair of wheels 11A and a rear pair of wheels 11B that are configured to rotate about two parallel axes of rotation 15A and 15B, respectively, when the vehicle 10 is in motion.

The vehicle 10 may be divided into regions for purposes of discussion herein. For example, the vehicle 10 may be divided along its width between a driver side portion A and a passenger side portion B, and along its length between a front compartment portion C, a passenger compartment portion D, and a rear portion E. Accordingly, the vehicle 10 has six regions: a driver-side front region AC, a passenger-side front region BC, a driver-side passenger compartment region AD, a passenger-side passenger compartment region BD, a driver-side rear region AE, and a passenger-side rear region BE with boundaries between the regions shown with phantom lines in FIG. 1. A component or system may extend in more than one region depending upon its size and location.

The vehicle 10 includes an automated driver assistance system (ADAS) 12 and a force management system (FMS) 14 that, as configured and utilized as discussed herein, may be referred to together as a predictive control system. The ADAS 12 has an electronic control module 12A and one or more vehicle environment sensors 13 in operable communication with the electronic control module 12A. In the example shown, there are multiple vehicle environment sensors 13. The vehicle environment sensors 13 are configured to detect objects in the operating environment of the vehicle 10. Stated differently, the vehicle environment sensors 13 are operable to detect objects external to the vehicle 10. The objects may be other vehicles, structures, terrain, etc. and may be in motion or stationary.

Specifically, the ADAS 12 includes a camera system with a camera sensor 13A, a radar unit with a radar sensor 13B, and a lidar unit with a lidar sensor 13C. The ADAS also includes a global positioning system (GPS) receiver 16 in communication with one or more satellites (not shown) and other off-vehicle components of a GPS system. The sensors 13A, 13B, and 13C are vehicle environment sensors and may be referred to together herein with reference number 13. In some examples, the vehicle 10 may include one or two of the vehicle environment sensors 13A, 13B and 13C rather than each of the vehicle environment sensors 13A, 13B, and 13C and/or may include other additional types of vehicle environment sensors.

For purposes of discussion, the camera sensor 13A and the GPS receiver 16 are shown mounted near the top of the windshield 18 within a passenger compartment 20, and the radar sensor 13B and lidar sensor 13C are shown mounted near the front of the vehicle 10 such as to a front bumper 22 or to vehicle structure under a hood 24 but the locations of these components are not limited to those shown. Each of the vehicle environment sensors 13 and the GPS receiver 16 is operatively connected to the electronic control module 12A either with transfer conductors (wires) or wirelessly, and the connections are not shown in FIG. 1 for simplicity and clarity in the drawing. Additionally, the camera system, radar unit, and lidar unit of which the vehicle environment sensors 13A, 13B, and 13C are respectively included may each have a separate electronic control module that communicates the signals of the vehicle environment sensors 13A, 13B and 13C to the electronic control module 12A, or the vehicle environment sensors 13A, 13B, and 13C may transmit the respective sensor signals directly to the electronic control module 12A.

The FMS 14 includes one or more vehicle contact sensors 26 and one or more energy absorbing components 28, as well as an electronic control module 14A in operable communication with the vehicle contact sensors 26 and the energy absorbing components 28 (e.g., a wired or wireless connection). The electronic control module 14A may also be referred to as a sensing diagnostic module. The energy absorbing components 28 include restraints such as deployable airbags and active seatbelt systems. For example, the energy absorbing components 28 include deployable airbags included in airbag systems, such as a driver-side front airbag system 28A, a driver-side side airbag system 28B, a passenger-side front airbag system 28C, and a passenger-side side airbag system 28D. The energy absorbing components 28 may further include a driver-side active seatbelt system 28E and a passenger-side active seatbelt system 28F.

One or more of the energy absorbing components 28 discussed herein may be multi-stage components or reversible restraint systems or structures. For example, one or more of the airbag systems 28A, 28B, 28C, and 28D may be configured with airbags deployable in multiple stages (e.g., to multiple different volumes) according to the vehicle contact sensor signals and/or may be depowered when not activated. For example, the seatbelt systems 28E, 28F may include seatbelts and/or seatbelt tensioners that may be reversibly tensioned at different levels in response to the vehicle contact sensor signals and/or may be depowered when not activated. The vehicle bumper 22 and/or the vehicle hood 24 may be active structures, such as reversibly deployable structures activatable to be spaced further outward from their nondeployed positions in response to the vehicle contact sensor signals to enable a greater deformation space and resultant energy absorption by these structures and/or may be depowered when not activated. In the example shown, the vehicle bumper 22 is an active bumper that may be activated by the electronic control module 14A to move outward and absorb energy such as from contact of the vehicle 10 with an external object such as external object 40 in FIG. 2. Similarly, the hood 24 is an active hood that may be activated by the electronic control module 14A to move outward and absorb energy such as from contact of the vehicle 10 with an external object such as external object 40 in FIG. 2. Accordingly, the energy absorbing components of the FMS 14 include the energy absorbing components 28A, 28B, 28C, and 28D as well as the active bumper 22 and the active hood 24.

Figure 2:
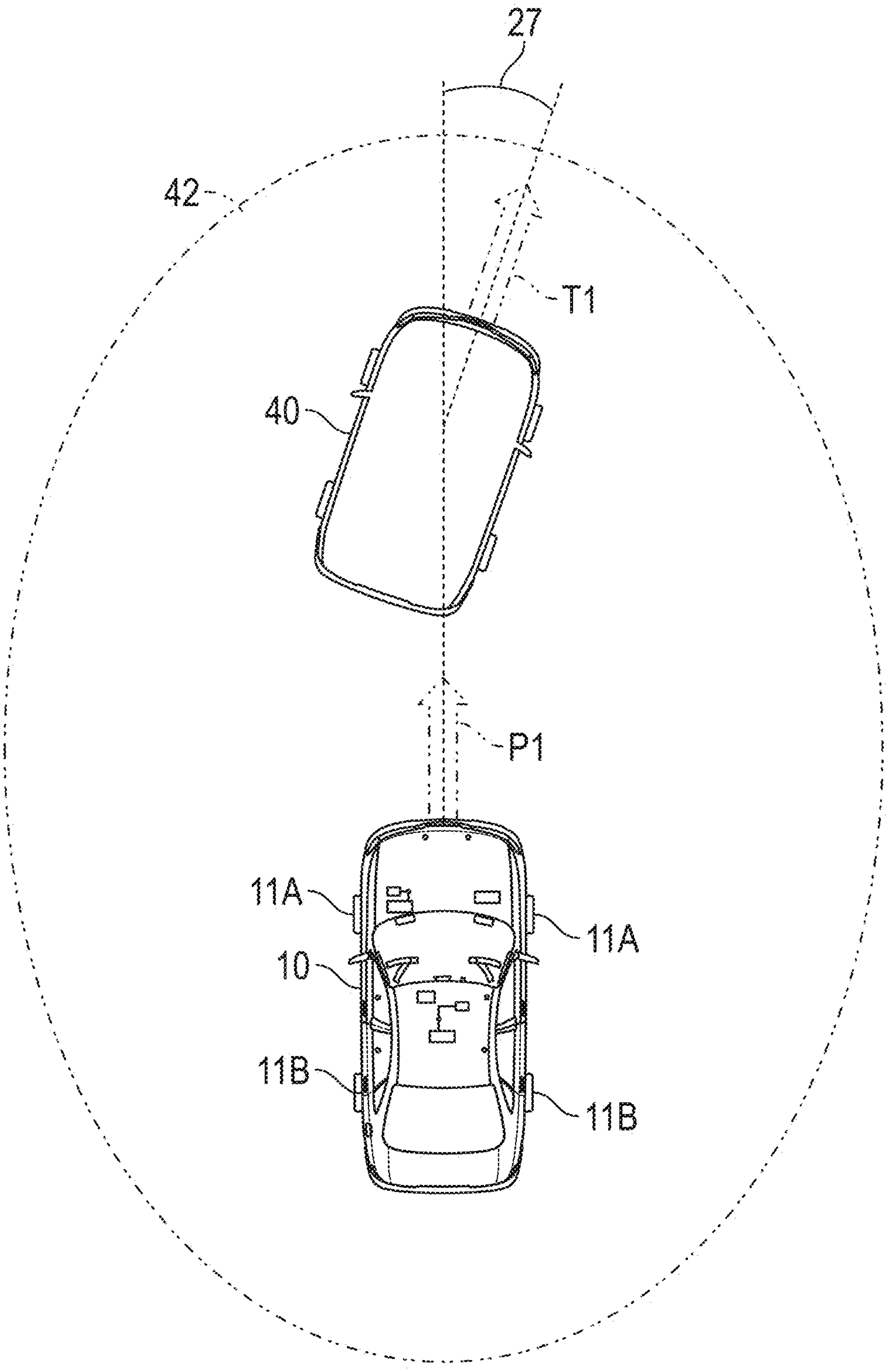
FIG. 2 is a schematic illustration of the vehicle of FIG. 1 utilizing the FMS to detect an external object in the operating environment of the vehicle and showing a vehicle path and a trajectory of the object with phantom arrows.

The vehicle contact sensors 26 include sensors that sense information that may be an indication of present or imminent contact of the vehicle 10 with an external object such as external object 40 in FIG. 2. For example, the vehicle contact sensors 26 include two accelerometers 26A and 26B that may also be referred to as electronic front sensors. Accelerometers 26A and 26B are operable to indicate changes in speed, for example, that may be indicative of current or imminent contact of the vehicle 10 with the external object 40, and are thus referred to as vehicle contact sensors. The vehicle contact sensors 26 also include pressure sensors 26C, 26D, 26E, and 26F shown positioned along the sides of the vehicle 10 with the pressures sensors 26C and 26D near or in the front of the passenger compartment 20 (in regions AD and B, respectively) and the pressure sensors 26E and 26F near or in the rear of the passenger compartment 20 (in regions AE and BE, respectively), although not limited to these positions. There may be fewer or more vehicle contact sensors 26 than shown.

The vehicle 10 may include relatively high power or high voltage electric power systems (EPS) 30, such as one or more battery systems or sub-systems. In the example shown, there are two such EPS systems 30, EPS 30A located generally under the hood 24 in region AC, and EPS 30B located under the floor of the passenger compartment 20 and extending in both regions AD and BD, although the disclosure is not limited to these locations or this number of electric power systems. Each EPS 30A and 30B includes a respective electronic control module 30C, a respective electric power device 30D, such as a battery pack, and a disconnect device 30E activatable to disconnect the electric power device 30D from the remainder of the EPS system 30, thus terminating electric power to or from the electric power device 30D. The disconnect device 30E may be a pyrotechnic disconnect device that prevents electric power flow along one or more transfer conductors (e.g., wires) connecting the electric power device 30D and the pyrotechnic disconnect device 30E when the pyrotechnic disconnect device 30E is activated. Alternatively, the disconnect device 30E may be a switch in an electrical circuit that opens or closes when activated to thereby terminate the electric power flow to or from the electric power device 30D.

FIG. 2 is a schematic illustration of the vehicle 10 of FIG. 1 utilizing the ADAS 12 of FIG. 1 to detect an object 40 in the vehicle operating environment 42. The vehicle operating environment 42 may extend to the limits of the surroundings detectable by the one or more vehicle environment sensors 13. The various components and systems of the vehicle 10 shown and described in FIG. 1 are not repeated in FIG. 2 for clarity in the drawing. Specifically, the vehicle environment sensors 13 shown in FIG. 1 are operable to detect the object 40 and communicate sensor data to the electronic control module 12A. The electronic control module 12A is configured to execute stored instructions by which it carries out at least a portion of the method 100 shown and discussed in FIG. 5. Although certain steps of the method 100 are discussed herein as carried out by the electronic control module 12A and other steps carried out by the electronic control module 14A or by the one or more additional electronic control modules 30C, one or more of the various steps may instead be carried out by a different one of the electronic control modules and/or the electronic control modules may be merged together as a single electronic control module or fewer electronic control modules in some implementations.

For example, based at least partially on the data from the vehicle environment sensors 13 and, in some examples, the GPS receiver 16, (also referred to as sensor data) the electronic control module 12A determines a current path P1 of the vehicle 10, a current trajectory T1 of the object 40, and whether the current path P1 and the current trajectory T1 intersect. Although the path P1 is shown as straight in FIG. 2, the environment sensors 26 may be able to ascertain that the vehicle 10 is following a curved road, for example, in which case the arrow for the path P1 may be curved.

Based at least partially on the data from the vehicle environment sensors 13, the electronic control module 12A is configured to determine a velocity differential between the vehicle 10 and the object 40. The object 40 may be in motion or stationary. In some examples, the vehicle 10 may be running but stationary (e.g., parked or stopped at a traffic light). Based at least partially on the data from the vehicle environment sensors 13, such as the accelerometers 26A, 26B, the electronic control module 12A determines vehicle acceleration (e.g., the positive acceleration of the vehicle 10 or the negative acceleration (deceleration) of the vehicle 10), a time to predicted contact of the external object 40 with the vehicle 10 (which may be based on the determined velocity differential and acceleration as well as a determination of a current distance to the detected object 40). Further based at least partially on the data from the vehicle environment sensors 13 and the determined distance, velocity differential, acceleration (which are ultimately, in turn based at least partially on the data from the vehicle contact sensors 26), the electronic control module 12A determines a predicted contact angle of the object 40 with the vehicle 10 (e.g., an angle between the path P1 of the vehicle 10 and the trajectory T1 of the object 40 at the time of contact), a predicted direction of contact of the object 40 with the vehicle 10 (e.g., from a forward direction, from a rear direction, or from a side direction relative to a center of the vehicle 10). An example predicted angle of contact 27 is indicated in FIG. 2. The electronic control module 12A may further determine the region of the vehicle 10 at which the contact is predicted (e.g., one of the six regions AC, BC, AD, BD, AE, and BE discussed with respect to FIG. 1).

If the electronic control module 12A determines that the current path P1 of the vehicle 10 and the current trajectory T1 of the external object 40 intersect, then the electronic control module 12A is configured to assign a categorization of the predicted contact of the vehicle 10 with the external object 40. For example, the electronic control module 12A may compare the determined distance, velocity differential, acceleration, time to contact, predicted contact angle, and predicted direction of contact with predetermined groupings of such characteristics that are stored as separate categorizations according to the ranges of the values (e.g., magnitudes) and/or other aspects of the values, such as the region of the vehicle 10 at which the contact with the external object 40 is predicted to occur.

The categorization may be based at least partially on the velocity differential, the vehicle acceleration, the time to predicted contact, the predicted contact angle, and the predicted direction of contact. In an example, the categorization may include a first category CAT1, a second category CAT2, and a third category CAT3. The velocity differential and the vehicle acceleration may be lower in the first category CAT1 than in the second category CAT2, and lower in the second category CAT2 than in the third category CAT3. However, in some examples, other aspects determined by the electronic control module 12A, such as the predicted contact angle, the predicted direction of contact, an approaching intersection (as indicated by the GPS received 16, for example) may cause a categorization of a predicted contact as a third category CAT3 even though the velocity differential and vehicle acceleration if considered alone might otherwise indicate a second category CAT2 assignment of categorization.

Figure 3:
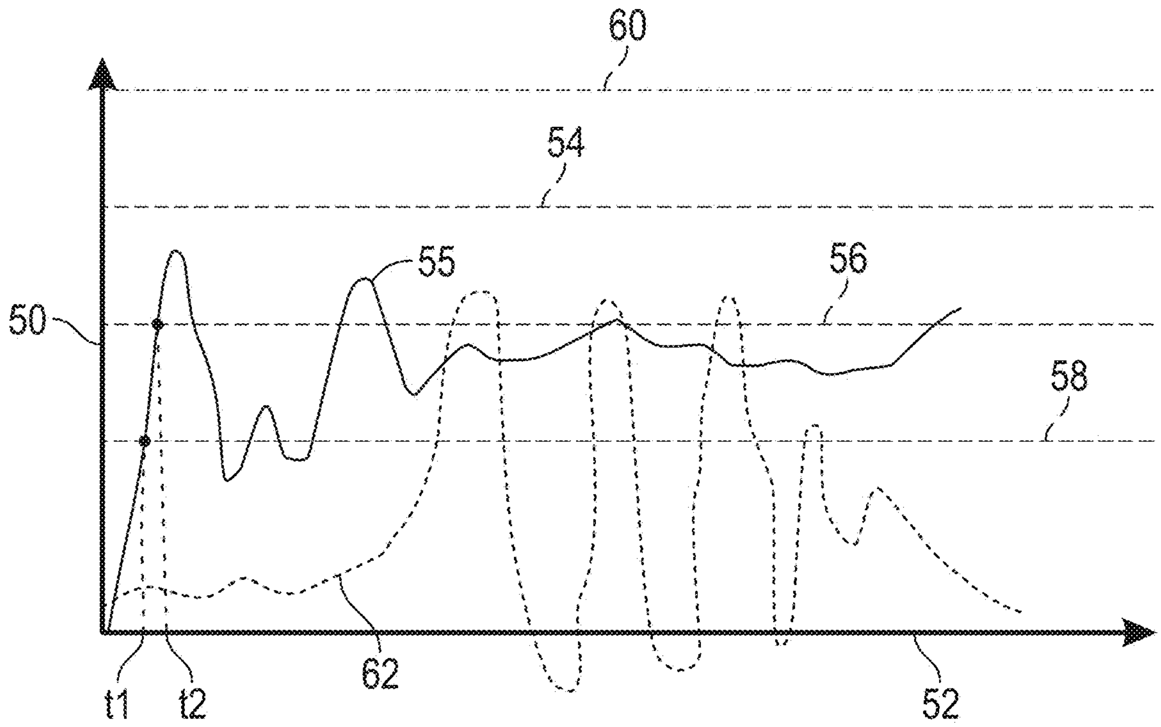
FIG. 3 is a graph of magnitude of a vehicle contact sensor signal versus time showing exemplary plots and various example trigger thresholds at which an energy absorbing component of the FMS is activated.

FIG. 3 is a graph of vehicle contact sensor signal magnitude 50 on a Y axis (e.g., the magnitude of a sensor signal received by the electronic control module 12A from one or more of the vehicle contact sensors 26) versus time 52 on the X axis which may be measured in milliseconds, for example. A baseline stored trigger threshold 54 of the magnitude of the signal of the vehicle contact sensor 26 at which one or more of the energy absorbing components 28 are activated is shown. For example, the baseline stored trigger threshold 54 is an existing and pre-programmed default trigger threshold. Under the method 100 of FIG. 5, the trigger threshold is adjusted (also referred to as recalibrated) based on the categorization of the predicted contact of the vehicle 10 with the external object 40 discussed above. For example, if the predicted contact is assigned as the first category CAT1, the default trigger threshold 54 may be maintained (e.g., the adjustment is zero or, stated differently, trigger threshold is not changed). An example first vehicle contact sensor signal 55 does not reach the default and CAT1 trigger threshold 54 over the period of time shown. For example, the predicted time to contact may be sufficiently long to allow waiting to ensure that the first vehicle contact sensor signal 55 rises to the trigger threshold 54 before activating one or more of the energy absorbing components 28 and thus more likely indicates actual contact of the object 40 with the vehicle 10 as opposed to other factors creating "noise" in the signal 55.

If the predicted contact of the vehicle 10 with the object 40 based at least partially on the data from the one or more vehicle environment sensors 13 is categorized as the second category CAT2 or as the third category CAT3, however, the trigger threshold is adjusted downward (decreased) under the method 100 such that a sensor signal from a vehicle contact sensor 26 is likely to be exceed the lowered trigger threshold earlier than if the default trigger threshold 54 was maintained. For example, the trigger threshold may be adjusted downward from the default trigger threshold 54 to trigger threshold 56 for a predicted contact categorized as the second category CAT2, and may be adjusted even further downward (e.g., further lowered) to trigger threshold 58 for a predicted contact categorized as the third category CAT3. The downward adjustment of the trigger threshold is thus greater for the third category CAT3 than for the second category CAT2. As such, the same vehicle contact sensor signal 55 will trigger activation of one or more of the energy absorbing components 28 as early as time t2 for predicted contact in the second category CAT2 and as early as time t1 for predicted contact in the third category CAT3 given their shorter predicted times to contact.

FIG. 3 also shows another vehicle contact sensor signal 62. The vehicle contact sensor signal 62 is actually due to factors that may cause an increase in variation of a sensor signal from a vehicle contact sensor 26 but that do not in fact warrant activation of an energy absorbing device 22, 24, or 28, such as a rough terrain (e.g., off-road driving or train tracks, etc.) and associated changes in vehicle velocity and acceleration, for example. Stated differently, the variations in the vehicle contact sensor signal 62 are not in fact due to imminent or current contact of the vehicle 10 with an external object 40. As such, deploying energy absorbing components, or at least non-reversible energy absorbing components such as airbags of the airbag systems 28A, 28B, 28C, and 28D would be unnecessary. In order to prevent needless activation under such circumstances, data from the vehicle environment sensors 13 can be used to determine such environments and the vehicle contact sensor trigger threshold may be adjusted upwards (e.g., increased) by the ADAS electronic control module 12A, such as to trigger threshold 60 shown in FIG. 3, when there has not been a determination of predicted intersection of the vehicle path P1 with a trajectory of an object 40. In other words, the raising of the vehicle contact sensor trigger threshold does not occur if there is a predicted contact based at least partially on the data from the one or more vehicle environment sensors 13, but may occur if the data from the one or more vehicle environment sensors 13 indicates no predicted contact and, in addition, indicates that the vehicle is in a predetermined specific vehicle operating environment.

Figure 4:
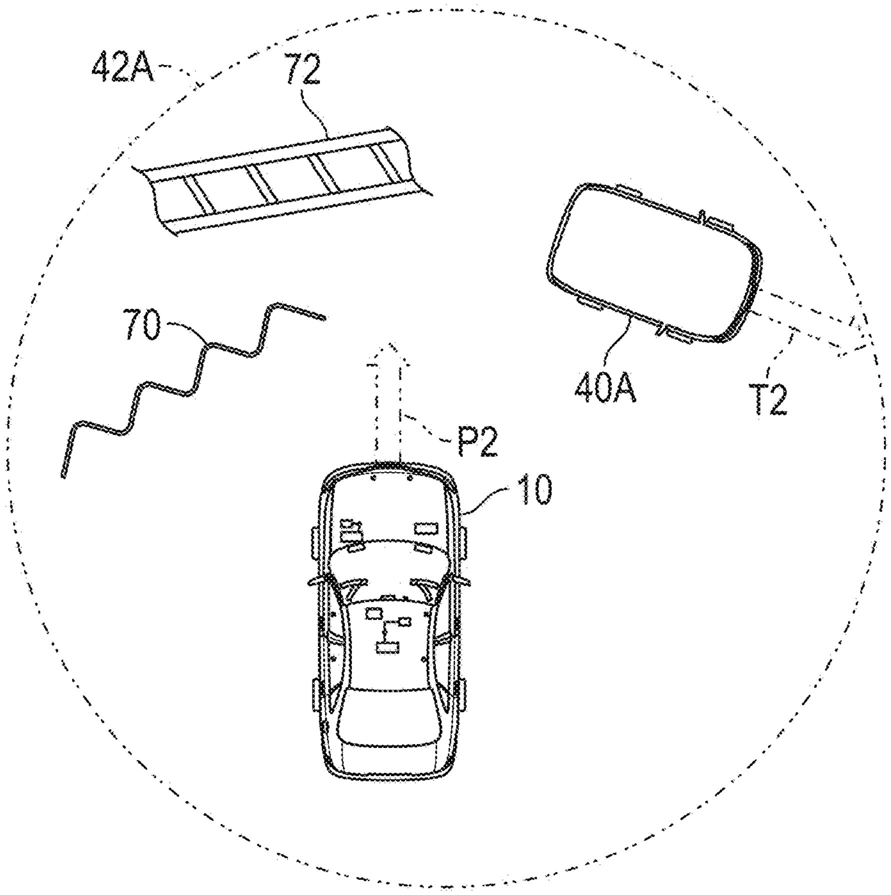
FIG. 4 is another schematic illustration of the vehicle of FIG. 1 in a different operating environment.

FIG. 4, for example, illustrates such a predetermined specific operating environment 42A. Data from the one or more vehicle environment sensors 13 shown in FIG. 1 is relied upon by the ADAS electronic control module 12A in determining the current vehicle path P2, the current trajectory T2 of an external object 40A (in a different position relative to the vehicle 10 than the object 40 in FIG. 2 and having a different trajectory T2) as well as the velocity difference and the vehicle acceleration. Based on these determinations, the electronic control module 12A further determines that the current vehicle path P2 and the trajectory T2 of the object 40A do not intersect. The one or more vehicle environment sensors 13 also recognize the relatively rough terrain 70 and train tracks 72 in the vehicle operating environment 42A such as by comparing the sensed data (e.g., images or other data from the camera sensor, radar sensor or lidar sensor, etc.) relating to the terrain 70 and train tracks 72 to stored information. In this situation, the trigger threshold may be adjusted upwards (increased) to the trigger threshold 60 of FIG. 3 because the vehicle 10 is determined to be in a predetermined specific vehicle operating environment and contact of the vehicle 10 with an external object is not currently predicted. Alternatively, the default trigger threshold 54 may be maintained.

The trigger threshold 54, 56, 58, or 60 implemented for the assigned categorization CAT1, CAT2, or CAT3 may result in a step function for the activation of the one or more energy absorbing components 28. Because time to predicted contact is determined, the trigger threshold adjustment may be correlated with a specific time to predicted contact. Accordingly, when it is determined that time to predicted contact is above that specific time to contact, the FMS electronic control module 14A does not activate (e.g., command deployment of) the one or more energy absorbing components 28. Instead, the vehicle 10 may implement an automatic emergency braking system, for example. In an example, when the predicted time to contact is less than the specific time to contact associated with the trigger threshold, the FMS electronic control module 14A activates the one or more energy absorbing components 28 (in addition to the automatic emergency braking system).

The adjusted trigger threshold may also be utilized to activate one or more electric power disconnect devices such that electric power to and from the associated electric power component 30D is interrupted. For example, an indication that the adjusted trigger threshold has been met may be communicated by the FMS electronic control module 14A to the electronic control module 30C of one or more electric power systems 30, such as electric power system 30A and/or 30B so that the electronic control module 30C of electric power system 30A and/or 30B activates the associated disconnect device 30E. Alternatively, the FMS electronic control module 14A may instead provide a signal to the electronic control module 30C indicating that activation of the one or more energy absorbing components 28 has been commanded, and the electronic control module 30C might then command activation of the disconnect device 30E based on the indication that the one or more energy absorbing components 28 have been activated.

As with the energy absorbing components 28, activation of the disconnect devices 30E may be region-specific. For example, because the direction of contact and angle of contact are predicted based at least partially on the data from the one or more vehicle environment sensors 13, the ADAS electronic control module 12A and/or the FMS electronic control module 14A may use this information to determine which region or regions of the vehicle 10 may be affected by the predicted contact. The trigger threshold for activation of the one or more energy absorbing components 28 might be adjusted and a command to activate one or more disconnect devices 30E under the method implemented herein might be for those one or more energy absorbing components 28 and electric power components 30D in the one or more predicted affected regions but not for those in regions not predicted to be affected. In one example, if the predicted contact is at the driver-side front passenger compartment region AC and is assigned category CAT1, then the energy absorbing components 22, 24, 28A, 28B, and 28E and the disconnect device 30E of the electric power system 30A are activated whereas the energy absorbing components 28 in regions BC, AD, BD, and AE may not be activated, and an activation command may not be provided to the disconnect device 30E of the electric power system 30C in regions AD and BD. If the assigned category is instead CAT2 or CAT3, energy absorbing components and disconnect devices located outside of the region or regions predicted to be affected by the predicted contact might also be activated.

Figure 5:
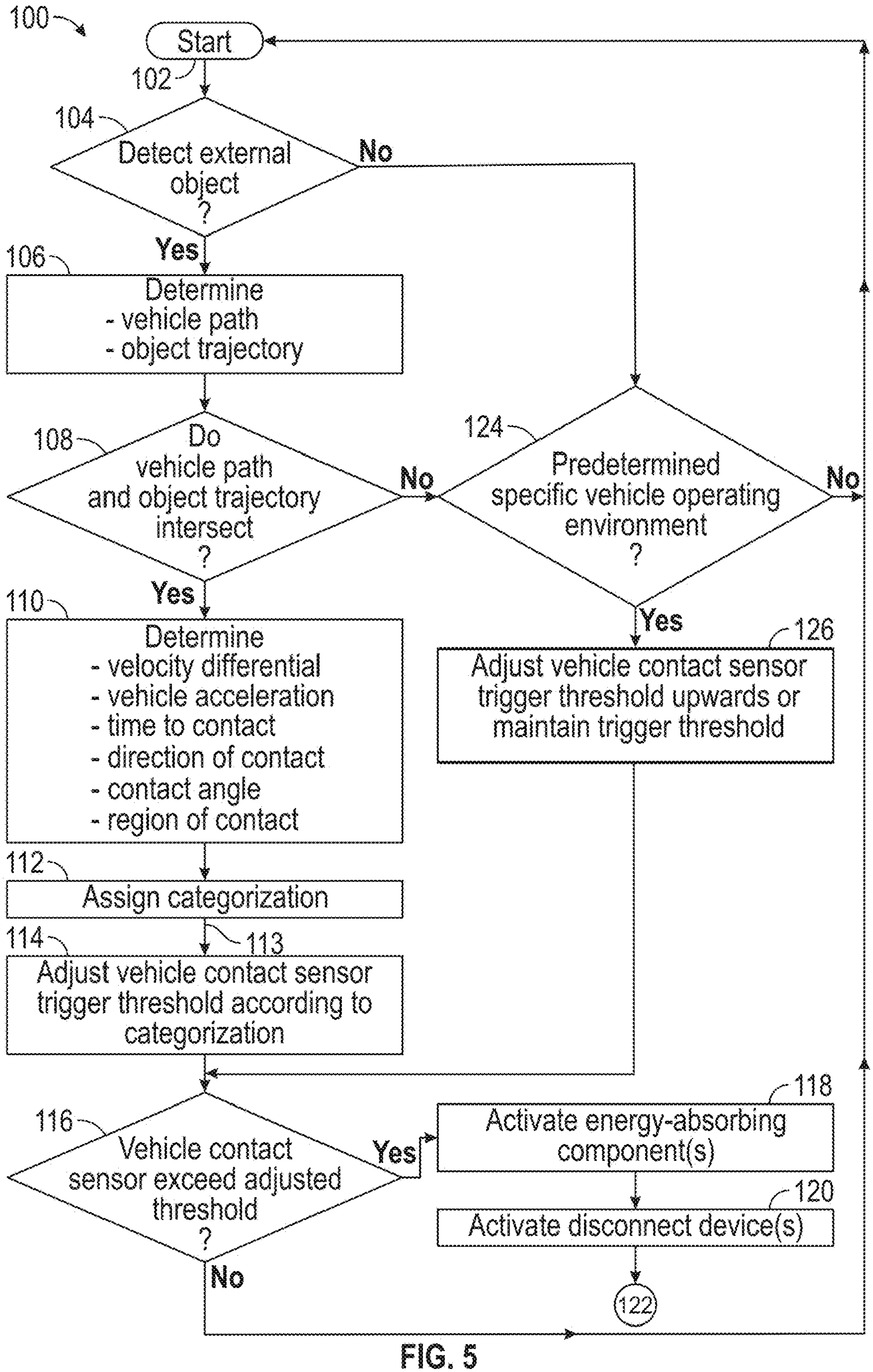
FIG. 5 is a flow chart illustrating an example method of dynamically adjusting the trigger threshold of the vehicle contact sensor signal based at least partially on data from the ADAS.

FIG. 5 is a flow chart illustrating an example method 100 of dynamically adjusting the trigger threshold of a vehicle contact sensor signal for activation of an energy absorbing device 22, 24, and/or 28 of the FMS 14 in real time, while the vehicle is being operated, based at least partially on data from the ADAS 12. The method begins at block 102, start, which may be upon starting the vehicle 10 and/or an indication that the vehicle 10 begins moving.

The method 100 includes block 104, detecting an object (e.g., object 40 or 40A) external to the vehicle 10 via one or more vehicle environment sensors 13 (e.g., the camera sensor 13A, the radar sensor 13B, the lidar sensor 13C, and/or the GPS receiver 16). The method 100 may limit block 104 to external objects detected that are in motion and/or that are at least a predetermined size.

If an external object is detected in block 104, the method 100 then moves to block 106, determining, based at least partially on data from the one or more vehicle environment sensors 13, a current path of the vehicle 10 (e.g., current path P1 in FIG. 3 or current path P2 in FIG. 4) and a current trajectory of the object (e.g., current trajectory T1 of external object 40 in FIG. 3 or current trajectory T2 of external object 40A in FIG. 4).

The method 100 then moves to block 108 in which it is determined whether the current path of the vehicle 10 and the current trajectory of the object intersect. If it is determined in block 108 that the current path of the vehicle and the current trajectory of the external object intersect, then the method 100 moves to block 110, in which information relevant to categorizing the predicted contact is determined. Stated differently, in blocks 106, 108, and 110, mathematical and spatial equations stored in the electronic control module 12A are solved based at least partially on the data from the one or more vehicle environment sensors 13. For example, in block 110, a velocity differential between the vehicle 10 and the object 40 is determined (e.g., the net speed at which the object is moving towards the vehicle 10). If either of the vehicle 10 or the object 40 is stationary, then its velocity is considered to be zero for the calculation.

In block 110, the acceleration of the vehicle 10 is determined, such as by the ADAS 12 (e.g., from data from the one or more vehicle environment sensors 13 or from the GPS receiver 16), or from a signal from one or more accelerometers 26A, 26B of the FMS 14.

In block 110, a time to predicted contact, a predicted contact angle, a predicted direction of contact of the external object 40 with the vehicle 10, and the region of the vehicle 10 predicted to be contacted by the external object 40 are determined based at least partially on the data from the one or more vehicle environment sensors 13. It should be appreciated that a fewer number of determinations may be made in block 110 and/or different determinations may be made.

Next, the method 100 moves to block 112 in which the predicted contact is categorized based at least partially on the data from the one or more vehicle environment sensors 13, and, more specifically, based on the determinations made in block 110. Stated differently, in block 112, the method 100 includes assigning a categorization of the predicted contact of the vehicle 10 with the external object 40 based at least partially on the data from the one or more vehicle environment sensors 13. As discussed above, the categories may include a first category CAT1, a second category CAT2, and a third category CAT3. However, the categorization may include fewer or more categories that may be assigned.

Blocks 104, 106, 108, 110, and 112 of the method 100 may be executed wholly or at least partially by the ADAS electronic control module 12A. After block 112, the categorization assigned in block 112 may be communicated to the FMS electronic control module 14A, as represented by arrow 113, and then in block 114, the method 100 may include adjusting, based on the categorization, a trigger threshold of a vehicle contact sensor 26 at which an energy absorbing component 28 is activated. The adjusting may be executed by the electronic control module 14A of the FMS 14. As discussed above, the trigger threshold adjusted may be for a vehicle contact sensor 26 in a region of the vehicle 10 which the object 40 is predicted to contact and trigger thresholds for at least some of the remaining regions may be left unadjusted. In another alternative, trigger thresholds even for vehicle contact sensors 26 outside of the region of the vehicle 10 at which contact is predicted may also be adjusted in some implementations (e.g., for a CAT3 assigned categorization). For an assignment of the first category CAT1, the adjustment of the trigger threshold may be an adjustment of zero (e.g., the trigger threshold remains at an existing, baseline threshold and is not adjusted up or down).

After assigning a categorization to the predicted contact in block 112, the method 100 moves to block 116 in which it is determined whether the vehicle contact sensor 26 exceeds the trigger threshold as adjusted in block 114 (e.g., whether the sensor signal received by the electronic control unit 14A from the vehicle contact sensor 26 exceeds the adjusted trigger threshold). The sensor signal 26 will exceed the trigger threshold, for example, if actual contact occurs as predicted. However, it may not happen as predicted if, for example, the vehicle 10 and/or the object 40 are operated to move away from their current path and/or trajectory such that no contact occurs. If it is determined in block 116 that the vehicle contact sensor threshold (as adjusted according to block 114) has been exceeded, then the method 100 moves to block 118, activating one or more of the energy absorbing components 22, 24, 26, and/or 28.

If the vehicle contact sensor 26 (e.g., the sensor signal therefrom) has not exceed the adjusted trigger threshold after a period of time after implementing block 116 (e.g., at an amount of time after the predicted time to contact), then the method 100 returns to block 102 and the one or more vehicle environment sensors 13 continue providing updated data regarding the operating environment of the vehicle 10, and the blocks 104-116 are repeated.

If the energy absorbing device is activated in block 118, the method 100 may also include block 120, activating one or more disconnect devices 30E as previously discussed. The method 100 then ends at block 122.

If an external object was not detected in block 104 or if an external object was detected in block 104 but it was determined in block 108 that the current vehicle path and the current trajectory of the external object do not intersect, then the method 100 proceeds to block 124 at which the electronic control module 12A of the ADAS 12 determines whether the vehicle 10 is operating in a predetermined specific vehicle operating environment. For example, the electronic control module 12A may determine, based at least partially on data from one or more vehicle environment sensors 13, the existence of terrain 70 or other obstacles (such as train tracks 72) may cause a variation in the magnitude of the vehicle contact sensor signal that is not due to an imminent or current contact of an external object with the vehicle 10. For example, the ADAS may be configured to recognize an offroad driving experience based on vehicle motion and the absence of roadways according to the vehicle environment sensors 13 and/or the GPS receiver 16. If such a predetermined specific vehicle operating environment is determined to exist in block 124, then the method 100 may proceed to block 126 in which the vehicle contact sensor trigger threshold is either maintained or is adjusted upwards (e.g., increased) in order to thwart unnecessary activation of an energy absorbing component 22, 24, 26, or 28 and/or a disconnect device 30E. The method 100 then proceeds to block 116. If such a predetermined specific vehicle operating environment is not determined to exist in block 124, then the method 100 returns to block 102 in order to continue monitoring and responding to the vehicle operating environment.

While the best modes for carrying out the disclosure have been described in detail, those familiar with the art to which this disclosure relates will recognize various alternative designs and embodiments for practicing the disclosure within the scope of the appended claims.

What is claimed is:

1. A method of dynamically adjusting a sensing threshold of a vehicle contact sensor of a vehicle, the method comprising:

detecting an object external to the vehicle via one or more vehicle environment sensors;

determining, based at least partially on data from the one or more vehicle environment sensors, a current path of the vehicle, a current trajectory of the object, and whether the current path of the vehicle and the current trajectory of the object intersect;

if the current path of the vehicle and the current trajectory of the external object intersect, assigning a categorization of predicted contact of the vehicle with the external object based at least partially on the data from the one or more vehicle environment sensors; and adjusting, based on the categorization, a trigger threshold;

generating a contact signal with the vehicle contact sensor based on contact with the object;

comparing a magnitude of the contact signal to the trigger threshold; and activating an energy absorbing component of the vehicle in response to the magnitude of the contact signal exceeding the trigger threshold, wherein the energy absorbing component remains inactive while the magnitude of the contact signal remains below the trigger threshold.

2. The method of claim 1, wherein the vehicle environment sensors are included in an automated driver assistance system (ADAS) of the vehicle, and the energy absorbing component and the vehicle contact sensor are included in a force management system (FMS) of the vehicle;

wherein determining the current path of the vehicle, the current trajectory of the object, whether the current path of the vehicle and the current trajectory of the object intersect, and assigning the categorization is executed by an electronic control module of the ADAS;

wherein adjusting the trigger threshold of the vehicle contact sensor is executed by an electronic control module of the FMS, and the method including:

communicating the categorization from the electronic control module of the ADAS to the electronic control module of the FMS.

3. The method of claim 1, further comprising:

determining one or more of a velocity differential of the vehicle and the external object, vehicle acceleration, a time to predicted contact, a predicted contact angle, and a predicted direction of contact of the external object and the vehicle based at least partially on the data from the vehicle environment sensors; and wherein the categorization is based at least partially on the velocity differential, the vehicle acceleration, the time to predicted contact, the predicted contact angle, and the predicted direction of contact.

4. The method of claim 3, wherein:

the categorization includes a first category, a second category, and a third category;

the velocity differential and the vehicle acceleration are lower in the first category than in the second category, and are lower in the second category than in the third category;

the adjustment of the trigger threshold is a downward adjustment for the second category and for the third category and the trigger threshold is not adjusted for the first category; and the downward adjustment of the trigger threshold is greater for the third category than for the second category.

5. The method of claim 4, wherein the energy absorbing component is a multi-stage restraint or a reversible restraint, the categorization is the third category, and the contact is at least one of imminent contact and present contact.

6. The method of claim 3, wherein:

the vehicle includes multiple energy absorbing components located in different regions of the vehicle;

the predicted contact angle and the predicted direction of contact indicate the predicted contact with a specific one or more of the different regions; and the trigger threshold adjusted is a threshold for activation of one or more of the energy absorbing components in the specific one or more of the different regions.

7. The method of claim 3, wherein:

the vehicle includes an electric power system having an electric power device, an additional electronic control module operable to control electric power to the electric power device, and a disconnect device operable to terminate electric power flow to and from the additional electronic control module; and the disconnect device is activated at the trigger threshold of the vehicle contact sensor.

8. The method of claim 7, wherein:

the electric power system is one of multiple electric power systems located in different regions of the vehicle, each including an additional electronic module and a disconnect device;

the predicted contact angle and the predicted direction of contact indicate that the predicted contact is with a specific one or more of the different regions; and the disconnect device activated is for one or more of the additional electronic modules in the specific one or more of the different regions.

9. The method of claim 1, further comprising:

determining whether the data from the one or more vehicle environment sensors is indicative of a predetermined specific vehicle operating environment; and if the current path of the vehicle and the current trajectory of the object do not intersect, adjusting the trigger threshold upwards.

10. A predictive control system for force management response of a vehicle, the predictive control system including:

an automated driver assistance system (ADAS) including:

one or more vehicle environment sensors operable to detect an object external to the vehicle, and an electronic control module in communication with the one or more vehicle environment sensors;

a vehicle force management system (FMS) including:

a vehicle contact sensor operable to generate a contact signal based on contact with the object, an energy absorbing component, and an electronic control module in communication with the vehicle contact sensor and the energy absorbing component, and operable to:

compare a magnitude of the contact signal to a trigger threshold; and activate the energy absorbing component of the vehicle in response to the magnitude of the contact signal exceeding the trigger threshold, wherein the energy absorbing component remains inactive while the magnitude of the contact signal remains below the trigger threshold;

wherein the electronic control module of the ADAS is operable to:

determine, based at least partially on data from the one or more vehicle environment sensors, a current path of the vehicle, a current trajectory of the object, and whether the current path of the vehicle and the current trajectory of the object intersect;

assign a categorization of predicted contact of the vehicle with the object based at least partially on the data from the one or more vehicle environment sensors if the current path of the vehicle and the current trajectory of the external object intersect;

communicate the categorization to the electronic control module of the FMS; and wherein the electronic control module of the FMS is operable to adjust, based on the categorization, the trigger threshold.

11. The predictive control system of claim 10, wherein the electronic control module of the ADAS is operable to:

determine one or more of a velocity differential, vehicle acceleration, a time to predicted contact, a predicted contact angle, and a predicted direction of contact of the external object and the vehicle based at least partially on the data from the one or more vehicle environment sensors; and wherein the categorization is based at least partially on the velocity differential, the vehicle acceleration, the time to predicted contact, the predicted contact angle, and the predicted direction of contact.

12. The predictive control system of claim 11, wherein:

the categorization includes a first category, a second category, and a third category;

the velocity differential and the vehicle acceleration are lower in the first category than in the second category, and are lower in the second category than in the third category;

the adjustment of the trigger threshold is a downward adjustment for the second category and for the third category and the trigger threshold is not adjusted for the first category; and the downward adjustment of the trigger threshold is greater for the third category than for the second category.

13. The predictive control system of claim 12, wherein the energy absorbing component is a multi-stage restraint or a reversible restraint, the categorization is the third category, and the contact is at least one of imminent contact and present contact.

14. The predictive control system of claim 11, wherein:

the FMS includes multiple energy absorbing components located in different regions of the vehicle;

the predicted contact angle and the predicted direction of contact of the external object is with a specific one or more of the different regions; and the trigger threshold adjusted is a threshold for activation of one or more of the energy absorbing components in the specific one or more of the different regions.

15. The predictive control system of claim 10, wherein:

the vehicle includes an electric power system having an electric power device, an additional electronic control module operable to control electric power to the electric power device, and a disconnect device operable to terminate electric power flow to and from the additional electronic control module; and the disconnect device is activated at the trigger threshold of the vehicle contact sensor.

16. The predictive control system of claim 15, wherein:

the electric power system is one of multiple electric power systems located in different regions of the vehicle, each including an additional electronic module and a disconnect device;

a predicted contact angle between the vehicle and the external object and a predicted direction of contact of the external object with the vehicle indicate that the predicted contact is with a specific one or more of the different regions; and the disconnect device activated is for one or more of the additional electronic modules in the specific one or more of the different regions.

17. A vehicle comprising:

an automated driver assistance system (ADAS) including:

an electronic control module, and
one or more vehicle environment sensors in communication with the electronic control module of the ADAS, wherein
the one or more vehicle environment sensors operable to detect an object external to the vehicle;
a vehicle force management system (FMS) including:
a vehicle contact sensor operable to generate a contact signal based on contact with the object,
an energy absorbing component, and
an electronic control module in communication with the vehicle contact sensor and the energy absorbing component, and operable to:
compare a magnitude of the contact signal to a trigger threshold; and
activate the energy absorbing component of the vehicle in response to the magnitude of the contact signal exceeding the trigger threshold, wherein
the energy absorbing component remains inactive while the magnitude of the contact signal remains below the trigger threshold;
wherein the electronic control module of the ADAS is operable to:
determine, based at least partially on data from the one or more vehicle environment sensors, a current path of the vehicle, a current trajectory of the object, and whether the current path of the vehicle and the current trajectory of the object intersect;
assign a categorization of predicted contact of the vehicle with the external object based at least partially on the data from the one or more vehicle environment sensors if the current path of the vehicle and the current trajectory of the external object intersect;
communicate the categorization to the electronic control module of the FMS; and
wherein the electronic control module of the FMS is operable to adjust, based on the categorization, the trigger threshold.

18. The vehicle of claim 17, wherein:
the FMS includes multiple energy absorbing components located in different regions of the vehicle;
the predicted contact is with a specific one or more of the regions; and
the trigger threshold adjusted is a threshold for activation of one or more of the energy absorbing components in the specific one or more of the regions.

19. The vehicle of claim 17, further comprising:
an electric power system having an electric power device, an additional electronic control module operable to control electric power to the electric power device, and a disconnect device operable to terminate electric power to and from the additional electronic control module; and
wherein the disconnect device is activated at the trigger threshold of the vehicle contact sensor.

20. The vehicle of claim 19, wherein the energy absorbing component is a multi-stage restraint or a reversible restraint, and the contact is at least one of imminent contact and present contact.

* * * * *